Aug. 19, 1924.    1,505,462
H. G. HILLMAN
ROD PACKING
Filed April 8, 1922
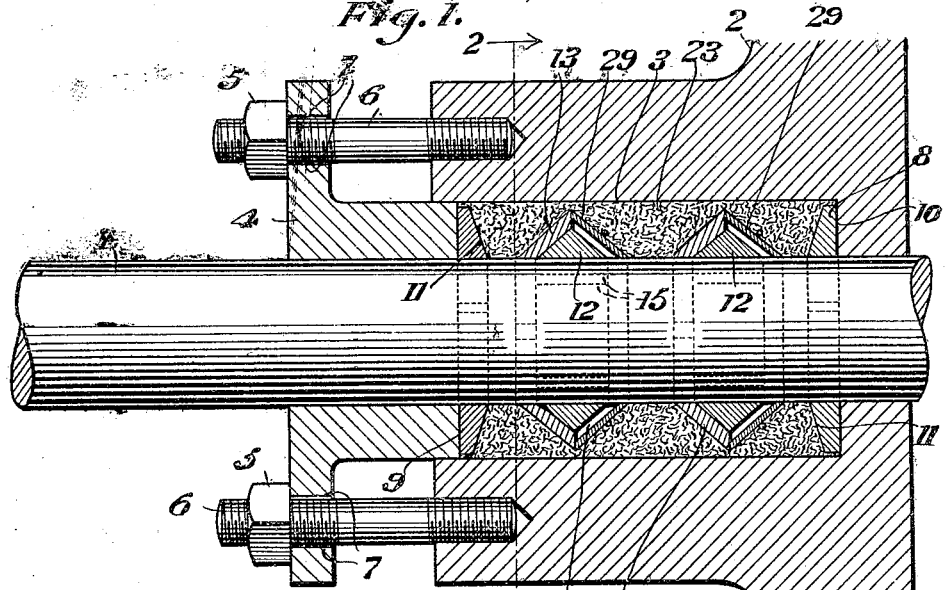
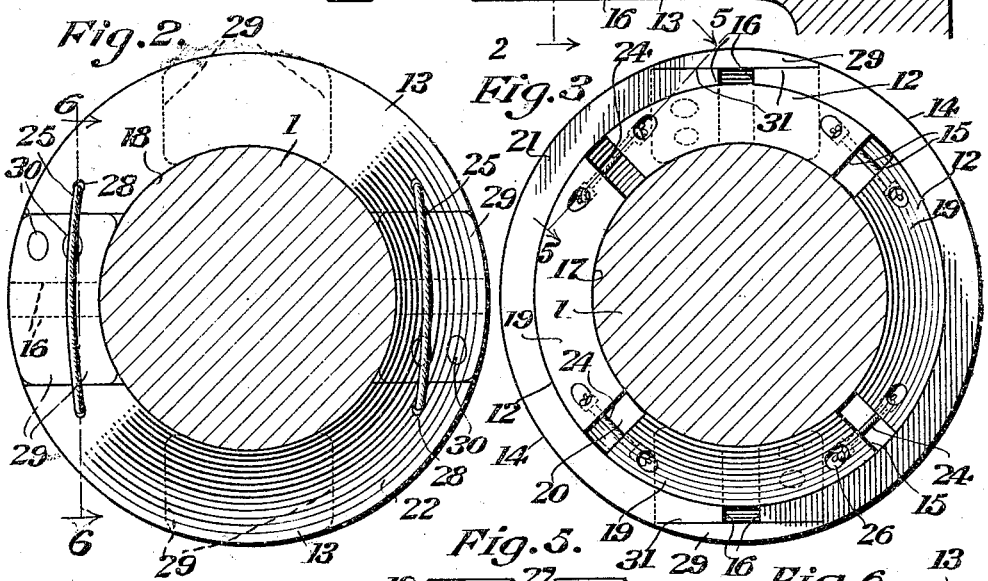
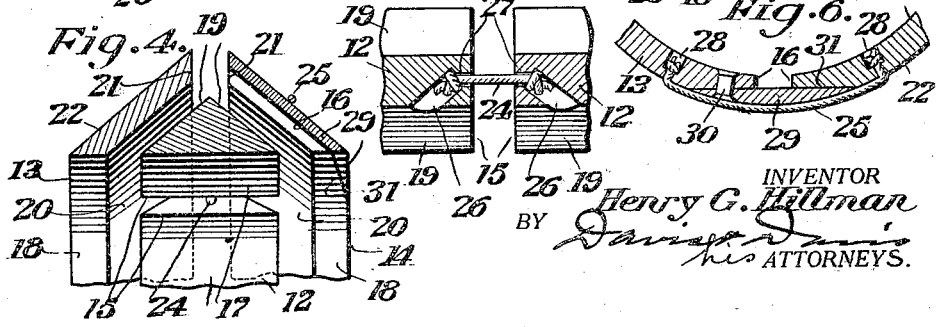
INVENTOR
Henry G. Hillman
BY
ATTORNEYS.

Patented Aug. 19, 1924.

1,505,462

UNITED STATES PATENT OFFICE.

HENRY G. HILLMAN, OF NEW YORK, N. Y.

ROD PACKING.

Application filed April 8, 1922. Serial No. 550,775.

*To all whom it may concern:*

Be it known that I, HENRY G. HILLMAN, a citizen of the United States, and resident of the borough of Manhattan, in the county, city, and State of New York, have invented certain new and useful Improvements in Rod Packings, of which the following is a specification.

This invention relates to improvements in rod packings, and has for its principal objects to provide efficient means for packing piston rods of fluid pressure engines, pumps, and the like, to provide a packing readily and effectively adjustable to take up wear, and to provide a packing which may be readily assembled on upstanding as well as horizontal rods.

To the above and other ends, which will hereinafter appear, the invention consists in the features of construction, arrangements of parts, and combinations of devices set forth in the following description and particularly pointed out in the appended claims.

In the accompanying drawing:

Figure 1 is a longitudinal sectional view showing the improved rod packing;

Fig. 2 a transverse sectional view on the line 2—2 of Fig. 1;

Fig. 3 a view similar to Fig. 2 with one of the outer sectional packing rings removed;

Fig. 4 a fragmentary sectional view taken on the same line as Fig. 1 showing the packing rings slightly separated;

Fig. 5 a detail view taken on the line 5—5 of Fig. 3; and

Fig. 6 a detail view taken on the line 6—6 of Fig. 2.

In the embodiment of the invention shown in the drawings, 1 designates a piston rod, 2 a stuffing box having a packing chamber 3, and 4 the usual gland or cap of the stuffing box which is adjustable in chamber 3 by means of the nuts 5 screwed on the usual threaded posts 6 carried by the stuffing box. Posts 6 extend loosely through the usual apertures 7 in the flanged outer end of the gland 4.

A washer or ring 8, divided into two sections to facilitate placing thereof on the rod 1, embraces rod 1 at the inner end of the chamber 3, and a similar washer or ring 9 embraces the rod adjacent the outer end of chamber 3. Ring 8 has one face abutting against the end wall 10 of chamber 3, and ring 9 has its outer face abutting against the inner end of the gland 4, both rings being preferably of somewhat less diameter than chamber 3, and having the sides thereof which face toward each other beveled as shown at 11.

Intermediate the rings 8 and 9 one or more sets or groups of metallic packing rings are clamped about the rod 1, two of these groups of rings being shown in Fig. 1. Each group comprises a central ring 12 of triangular form in transverse section, and two outer rings 13 and 14. Each of the rings, to facilitate assembly on the rod and to facilitate accurate adjustment to compensate for wear of the rings and rod, is preferably divided transversely into two or more arcuate sections. In the embodiment of the invention illustrated in the drawing the central ring 12 of each set or group of rings is divided into four sections, portions of the ring being cut away to leave spaces between the ends of the sections as shown at 15, while the outer rings 13 and 14 of each set or group of rings are divided into two sections, portions of these rings being cut away to leave spaces 16 between the ends of the ring sections. The spaces 16 between the sections of ring 13 are staggered relatively to the spaces 16 between the sections of ring 14, and the spaces 16 between the sections of both of the rings 13 and 14 are out of register with the spaces 15 between the sections of ring 12.

The inner edge 17 of ring 12, and the inner edge 18 of each of the rings 13 and 14, is ground concentric with the surface of rod 1 so as to seat closely on the rod and form a fluid-tight joint. The oppositely inclined faces 19 of ring 12, and the inner faces 20 of rings 13 and 14 which are inclined in opposite directions relatively to the axis of the rod, are ground so that each face 19 of the central ring 12 will be closely hugged by the face 20 of the adjacent outer ring, thus forming fluid tight joints between the rings. The outer edges 21 of rings 13 and 14 are ground so as to abut against each other and form a fluid tight joint, the outer edges of these rings being in a plane at a right angle to the axis of the rod 1.

The outer faces 22 of rings 13 and 14 are preferably concentric with the inner faces 20 of said rings so as to provide conoidal surfaces adapted to receive the pressure of a soft packing material 23 in such a manner as to effectively force the contacting surfaces of the set of rings together and force the sections of the rings radially inward upon the rod 1. The rings 13 and 14 are preferably of less diameter than chamber 3 to permit the soft packing 23 to be forced entirely around each group of rings, as shown in Fig. 1. Packing 23 may be formed of any suitable compressible material, such as fibrous asbestos compounds, shredded metallic packing, or the like. The soft packing 23 is pressed tightly in chamber 3 about the group or groups of rings, as shown, and as the rings and rod wear the sectional rings may be forced tightly against each other and about the rod by forcing the gland 4 farther into the chamber 3. Rings 8 and 9 serve to prevent forcing of the soft packing between the rod and gland 4 and also through the rod opening in the end wall 10 of the stuffing box. The pressure of the soft packing 23 on the beveled faces of rings 8 and 9 causes the sections of these rings to closely hug the rod 1.

To facilitate packing of the rod, the several sections of ring 12 are tied together by strings 24 and the sections of each of the rings 13 and 14 are tied together by strings 25. Holes 26 are bored into the sections of ring 12 from one face 19, and smaller holes 27 are bored into the ends of each section so as to connect with holes 26. The ends of strings 24 pass through holes 27 and are provided with knots countersunk in the larger holes 26. The ends of strings 25 are provided with knots countersunk in the inner larger ends of holes or passages 28 bored transversely through rings 13 and 14, the strings lying against the outer faces of the rings.

To prevent the soft packing 23 from being forced into the spaces 16 and thus preventing closing of the ring sections on the rod, cover plates 29 are provided to completely bridge the spaces between the sections of rings 13 and 14. Each of these plates 29 is preferably held at one end to one of the outer rings by soft lead rivets 30 so that, in the event of the soft packing resisting movement of the bridge plate when the gland 4 is forced inward, the rivets may shear off readily and permit the sections of rings 13 and 14 to be forced toward each other. The outer faces of the end portions of the sections of rings 13 and 14 are preferably bevelled or flattened as shown at 31 and the bridge pieces 29 are shaped so that their outer surfaces will not protrude beyond the faces 22 of the rings. There is thus little tendency of the ends of plates 29 to resist contraction of the ring sections by abutting against the soft packing material 23. The rings 13 and 14 are preferably formed of somewhat softer metal than ring 12 which is preferably formed of relatively hard wear-resisting metal. The pressure of the soft packing on the sections of rings 13 and 14 may thus slightly bend the ring sections if necessary to keep the faces 19 and 20 in close contact as the packing rings wear around their rod engaging edges.

What I claim is:

1. In a rod packing, the combination of a stuffing box having a chamber, a rod extending through the chamber, a metal ring of triangular form in transverse section and of substantially less diameter than the chamber surrounding the rod within said chamber and having its inner edge ground to closely embrace the rod, a pair of conoidal metal rings surrounding the rod within the chamber at opposite sides of the first mentioned ring and having their inner faces abutting against the oppositely inclined faces of the first-mentioned ring and their inner edges ground to closely embrace the rod, the outer edges of the two conoidal rings being ground and abutting against each other in a plane perpendicular to the rod, a soft packing material in the stuffing box pressed firmly about the rod and conoidal rings and extending over the joint between the outer edges of the conoidal rings, the inner faces of the conoidal rings and the two oppositely inclined faces of the first-mentioned ring being ground, each of the three rings being divided transversely into a plurality of sections having their ends spaced apart and the three rings being arranged with the spaces between sections of different rings out of register, metal plates bridging the spaces between the sections of the conoidal rings and located at the outer faces only of said rings, and means securing each plate to one section only of the adjacent ring.

2. In a rod packing, the combination of a stuffing box having a chamber, a rod extending through the chamber, a metal ring of triangular form in transverse section and of substantially less diameter than the chamber surrounding the rod within said chamber and having its inner edge ground to closely embrace the rod, a pair of conoidal metal rings surrounding the rod within the chamber at opposite sides of the first-mentioned ring and having their inner faces abutting against the oppositely inclined faces of the first-mentioned ring and their inner edges ground to closely embrace the rod, the outer edges of the two conoidal rings being ground and abutting against each other in a plane perpendicular to the rod, a soft packing material in the stuffing box pressed firmly about the rod and conoidal rings and extending over the joint between the outer edges of the conoidal rings, said three rings each being divided transversely into a plurality of sections having their ends spaced apart and being arranged with the spaces between the sections of different rings out of register, said stuffing box chamber being open at one end, a gland on the rod extending within the open end of the chamber, means for adjusting the gland longitudinally of the rod for compressing the soft packing about the set of three sectional rings, the outer faces of the end portions of the sections of the conoidal rings being beveled, metal plates bridging the spaces between the sections of the conoidal rings and each abutting against the beveled faces of two adjacent end portions of two ring sections, and means securing each plate to one ring section only.

3. In a rod packing, the combination of a stuffing box having a chamber, a rod extending through the chamber, a metal ring of triangular form in transverse section and of substantially less diameter than the chamber surrounding the rod within said chamber and having its inner edge ground to closely embrace the rod, a pair of conoidal metal rings surrounding the rod within the chamber at opposite sides of the first-mentioned ring and having their inner faces abutting against the oppositely inclined faces of the first-mentioned ring and their inner edges ground to closely embrace the rod, the outer edges of the two conoidal rings being ground and abutting against each other in a plane perpendicular to the rod, a soft packing material in the stuffing box pressed firmly about the rod and conoidal rings and extendings over the joint between the outer edges of the conoidal rings, said three rings each being divided transversely into a plurality of sections having their ends spaced apart and being arranged with the spaces between the sections of different rings out of register, said stuffing box chamber being open at one end, a gland on the rod extending within the open end of the chamber, and means for adjusting the gland longitudinally of the rod for compressing the soft packing about the set of three sectional rings, said first-mentioned ring being formed of hard metal and the conoidal rings being formed of soft metal.

4. In a rod packing, the combination of a stuffing box having a chamber, a rod extending through the chamber, a metal ring of triangular form in transverse section and of substantially less diameter than the chamber surrounding the rod within the said chamber and having its inner edge ground to closely embrace the rod, a pair of conoidal metal rings surrounding the rod within the chamber at opposite sides of the first-mentioned ring and having their inner faces abutting against the oppositely inclined faces of the first-mentioned ring and their inner edges ground to closely embrace the rod, the outer edges of the two conoidal rings being ground and abutting against each other in a plane perpendicular to the rod, a soft packing material in the stuffing box pressed firmly about the rod and conoidal rings and extending over the joint between the outer edges of the conoidal rings, said three rings each being divided transversely into a plurality of sections having their ends spaced apart and being arranged with the spaces between the sections of different rings out of register, said stuffing box chamber being open at one end, a gland on the rod extending within the open end of the chamber, means for adjusting the gland longitudinally of the rod for compressing the soft packing about the set of three sectional rings, the outer faces of the end portions of the sections of the conoidal rings being beveled, metal plates bridging the spaces between the sections of the conoidal rings and each abutting against the beveled faces of two adjacent end portions of two ring sections, and soft metal rivets securing each plate to one ring section only.

In testimony whereof I hereunto affix my signature.

HENRY G. HILLMAN.